(12) United States Patent
Reinke et al.

(10) Patent No.: US 7,881,846 B2
(45) Date of Patent: Feb. 1, 2011

(54) DRIVELINE CLUNK DETECTION AND CONTROL

(75) Inventors: Paul E. Reinke, Rochester Hills, MI (US); Roger Joseph Rademacher, Holt, MI (US)

(73) Assignee: GM Global Technology Operations, Inc.

( * ) Notice: Subject to any disclaimer, the term of this patent is extended or adjusted under 35 U.S.C. 154(b) by 1052 days.

(21) Appl. No.: 11/343,685

(22) Filed: Jan. 31, 2006

(65) Prior Publication Data

US 2007/0179695 A1  Aug. 2, 2007

(51) Int. Cl.
G06F 7/00 (2006.01)
G06F 17/00 (2006.01)

(52) U.S. Cl. .................. 701/54; 701/69; 123/350; 477/110

(58) Field of Classification Search .......... 701/54, 701/69; 123/350; 477/110
See application file for complete search history.

(56) References Cited

U.S. PATENT DOCUMENTS

| | | | | |
|---|---|---|---|---|
| 4,938,102 | A * | 7/1990 | Leising et al. | 477/154 |
| 5,081,588 | A * | 1/1992 | Holmes et al. | 701/52 |
| 5,520,593 | A * | 5/1996 | Yesel et al. | 477/77 |
| 5,574,643 | A * | 11/1996 | Yesel | 701/88 |
| 5,587,905 | A * | 12/1996 | Yesel et al. | 701/53 |
| 6,046,816 | A * | 4/2000 | Rawal et al. | 358/1.12 |
| 6,430,492 | B2 * | 8/2002 | Kotwicki et al. | 701/54 |
| 6,434,467 | B1 * | 8/2002 | O'Neil et al. | 701/54 |
| 6,543,414 | B2 * | 4/2003 | O'Neil et al. | 123/350 |
| 6,560,523 | B2 * | 5/2003 | Kotwicki et al. | 701/54 |
| 6,574,535 | B1 * | 6/2003 | Morris et al. | 701/22 |
| 6,754,573 | B2 * | 6/2004 | Russell et al. | 701/54 |
| 6,909,958 | B2 * | 6/2005 | Post et al. | 701/84 |
| 6,910,990 | B2 * | 6/2005 | Doering et al. | 477/110 |
| 7,072,748 | B2 * | 7/2006 | Kwon | 701/34 |
| 7,151,991 | B2 * | 12/2006 | Iida | 701/69 |
| 7,171,299 | B1 * | 1/2007 | Stroh | 701/110 |
| 2003/0171861 | A1 * | 9/2003 | Kwon | 701/34 |
| 2006/0179963 | A1 * | 8/2006 | Bachmann et al. | 74/339 |

FOREIGN PATENT DOCUMENTS

EP    0737598 A2    10/1996

OTHER PUBLICATIONS

NPL—Output Shaft Speed Sensor/Signal.*

* cited by examiner

*Primary Examiner*—Khoi Tran
*Assistant Examiner*—Ian Jen

(57) ABSTRACT

A driveline clunk control system for a vehicle having an engine that drives a driveline through a transmission includes a transmission output shaft speed (TOSS) sensor that generates a TOSS signal and a first module that receives the TOSS signal and that determines a secondary parameter ($\Delta$TOSS) based on the TOSS signal. A second module detects onset of a clunk condition based on the $\Delta$TOSS and a third module regulates operation of the vehicle to inhibit the clunk condition when the onset of the clunk condition is detected.

31 Claims, 6 Drawing Sheets

DRIVELINE CLUNK DETECTION AND CONTROL

FIELD OF THE INVENTION

The present invention relates to vehicle drivelines, and more particularly to a system for detecting and controlling driveline clunk.

BACKGROUND OF THE INVENTION

Automobiles generally include an internal combustion engine that generates drive torque via combustion of an air and fuel mixture. The drive torque is transferred to a driveline through a transmission. More specifically, the transmission includes an output shaft that is coupled to driveline components including, but not limited to, a differential, driveshafts, propeller shafts and a transfer case. In hybrid electric vehicles, an electric machine is included to selectively produce drive torque to drive the vehicle or to assist the engine in driving the vehicle.

Clunk is an objectionable driveline noise and vibration phenomena that is induced by torque reversals. Clunk initiates drive train ringing and body and chassis low frequency vibration. As the driveline goes from a driven condition (i.e., negative torque) to a drive condition (i.e., positive torque), the lash in the coupled components (e.g., the transmission, transfer case, universal joints, constant velocity joints, propeller shaft, differential and axle shafts) has to be eliminated before positive torque can be transmitted. Lash is defined as the movement that occurs without resistance, which results from imperfections and tolerance in coupled components. The lash elimination process causes unrestricted and minimally damped rotation of the driveline components until resistance occurs. Following the lash removal, the driveline components go into an under-damped, spring-mass oscillation, which generates both noise and vibration through the vehicle body.

Clunk normally occurs during the torque reversal generated by application of the throttle following a deceleration fuel cut-off or a high engine vacuum fuel deceleration. In the case of a hybrid vehicle that shuts off fuel at low speeds and idle, clunk can result from the electric machine cranking the engine for restart. Clunk is most prevalent when the restart occurs while the vehicle is moving, but can occur even with stationary starts.

Traditional methods of controlling clunk severity seek to minimize the angular acceleration of driveline components during the period in which lash is being taken up. However, identifying the condition during which the driveline lash is being taken up is critical. This condition changes with vehicle speed, engine speed, torque converter characteristics and the amount of lash. Traditional clunk control systems are unable to accurately identify when this condition occurs and to effectively minimize driveline clunk.

SUMMARY OF THE INVENTION

Accordingly, the present invention provides a driveline clunk control system for a vehicle having an engine that drives a driveline through a transmission. The driveline clunk control system includes a transmission output shaft speed (TOSS) sensor that generates a TOSS signal and a first module that receives the TOSS signal and that determines a secondary parameter (ΔTOSS) based on the TOSS signal. A second module detects onset of a clunk condition based on the ΔTOSS and a third module regulates operation of the vehicle to inhibit the clunk condition when the onset of the clunk condition is detected.

In other features, the third module regulates a spark timing of the engine to inhibit the clunk condition. The second module determines a spark retard based on a base spark retard, a spark retard multiplier, an engine RPM and an engine manifold absolute pressure (MAP). The second module decrements the spark retard multiplier when the ΔTOSS is greater than a ΔTOSS threshold.

In another feature, the driveline clunk control system further includes an electric motor that selectively generates drive torque to drive the driveline. The third module regulates an RPM ramp of the electric motor to inhibit the clunk condition.

In still other features, the driveline clunk control system further includes a fourth module that updates an engine RPM de-lash value when the &TOSS is greater than a &TOSS threshold. The fourth module determines an RPM error as a difference between an engine RPM and the engine RPM de-lash value and updates the engine RPM de-lash value when the RPM error exceeds an error threshold. The engine RPM de-lash value is updated by summing the engine RPM error and the engine RPM to generate an updated engine RPM de-lash value.

In another feature, the &TOSS is determined as an absolute value of a difference between the TOSS signal and a filtered TOSS signal.

In still another feature, the ΔTOSS is determined as a minimum change in the TOSS signal over a fixed sampling period.

In yet another feature, the ΔTOSS is determined as a rate of change of the TOSS signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
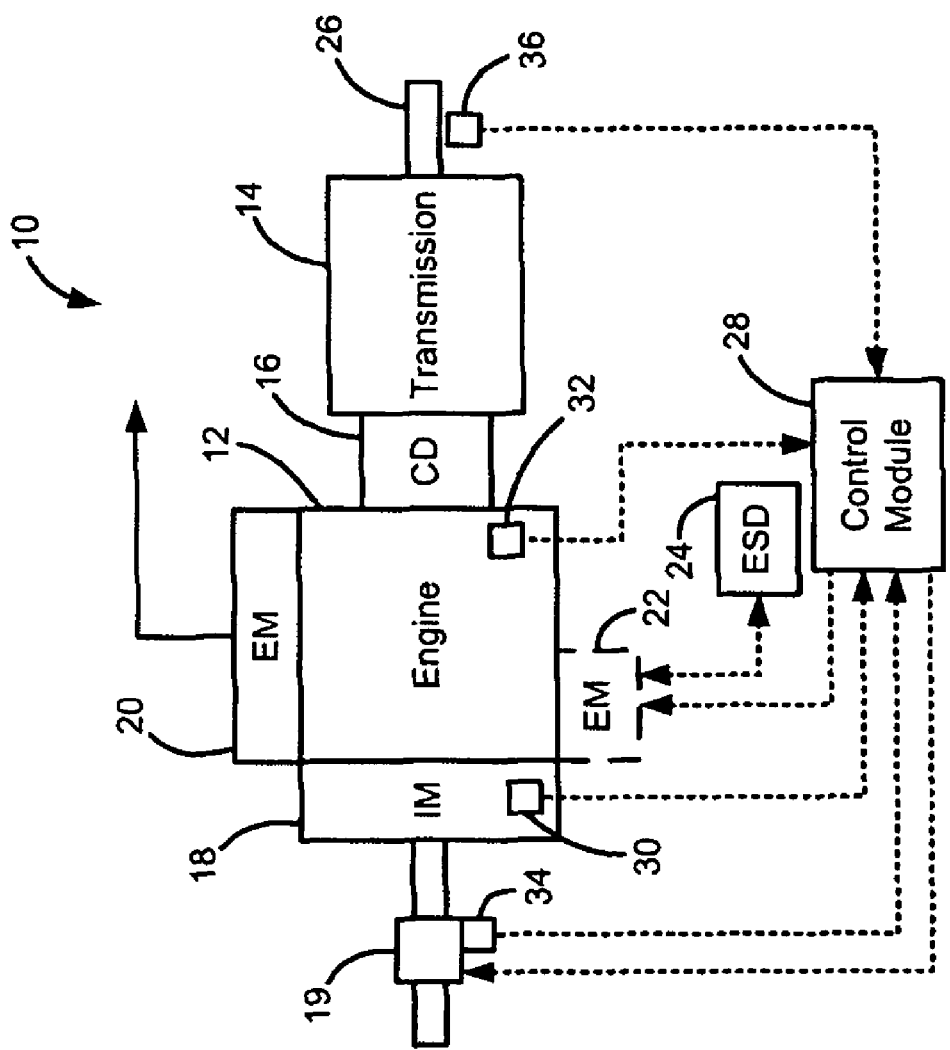
FIG. 1 is a functional block diagram of an exemplary vehicle that implements a driveline clunk control system in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the term clunk refers to an objectionable driveline noise and vibration that initiates driveline ringing and body and chassis low frequency vibration.

Referring now to FIG. 1, an exemplary vehicle 10 is illustrated. The vehicle 10 includes an engine 12 that drives a transmission 14 through a coupling device 16. Air flows into an intake manifold 18 of the engine 12 and is regulated using a throttle 19. The air is mixed with fuel to form a combustion mixture that is combusted within cylinders (not shown) to produce drive torque. Combustion gases are exhausted from the engine 12 through an exhaust manifold 20 and are treated in an exhaust after-treatment system (not illustrated).

In the case of the vehicle 10 being a hybrid electric, an electric machine 22 is provided. The electric machine 22 is operably coupled to the engine 12 and/or transmission 14 to transfer drive torque thereto or to be used in a regenerative braking procedure. More specifically, in a drive mode, the electric machine 22 is powered by an energy storage device 24 (e.g., battery and/or a super-capacitor) to produce drive torque that is transferred to the transmission 12. The electric machine 22 can function as the sole means of propulsion, or can be used to assist the engine 12. In a generator mode, the electric machine 22 operates to absorb vehicle kinetic energy to charge the energy storage device 24 or to power electrical vehicle loads.

The drive torque is transferred to the transmission 14 through the coupling device 16. In the case of an automatic transmission, the coupling device 16 is provided as a torque converter including a torque converter clutch (TCC) (not shown). In the case of a manual transmission, the coupling device 16 is provided as a clutch that is manually actuated by the vehicle operator to selectively couple the transmission 14 to the engine 12.

The transmission 14 includes a transmission output shaft 26 that is coupled to other driveline components (not shown) including, but not limited to, a transfer case, a differential, a propeller shaft and an axle shaft. Drive torque generated by the engine 12 and/or the electric machine 22 is multiplied by one of a plurality of gear ratios and is transferred to the driveline components via the output shaft 26. In the case of an automatic transmission, the particular gear ratio is automatically established based on vehicle operating parameters. In the case of a manual transmission, the gear ratio is manually established by the vehicle operator.

A control module 28 is responsive to various vehicle operating parameters and regulates operation of vehicle components based thereon. A manifold absolute pressure (MAP) sensor 30 and an engine RPM sensor 32 generate MAP and RPM signals, respectively, that are sent to the control module 28. A throttle position sensor 34 generates a throttle position signal that is sent to the control module 28. A transmission output shaft speed (TOSS) sensor 36 generates a TOSS signal that is sent to the control module 28. The TOSS signal is used in various forms of transmission control and is filtered and corrected for final drive ratios and tire rolling-radius to determine vehicle speed.

The control module 28 regulates vehicle operation based on the driveline clunk control of the present invention. In the case of a traditional vehicle powered using the engine 12, fuel can be cut-off to the engine 12 during deceleration. Following a deceleration fuel cut-off, when the engine 12 is to be fueled again, severe spark retard is used to reduce the drive torque and engine acceleration while the lash in the driveline is being removed (i.e., de-lash). In the case of a hybrid vehicle, an auto-start occurs when the gas pedal is depressed following an engine shutdown. A triple ramp starting process is used to reduce clunk during this restart, whereby the electric machine 22 rapidly increases engine RPM to a point where the torque converter is about to generating positive torque (i.e., first ramp), the rate of change of RPM is reduced dramatically until the lash is taken up (i.e., second ramp) and the engine speed is rapidly increased again and fuel is injected (i.e., third ramp). The timing of the second ramp is selected to enable de-lash without clunk.

Figure 2:
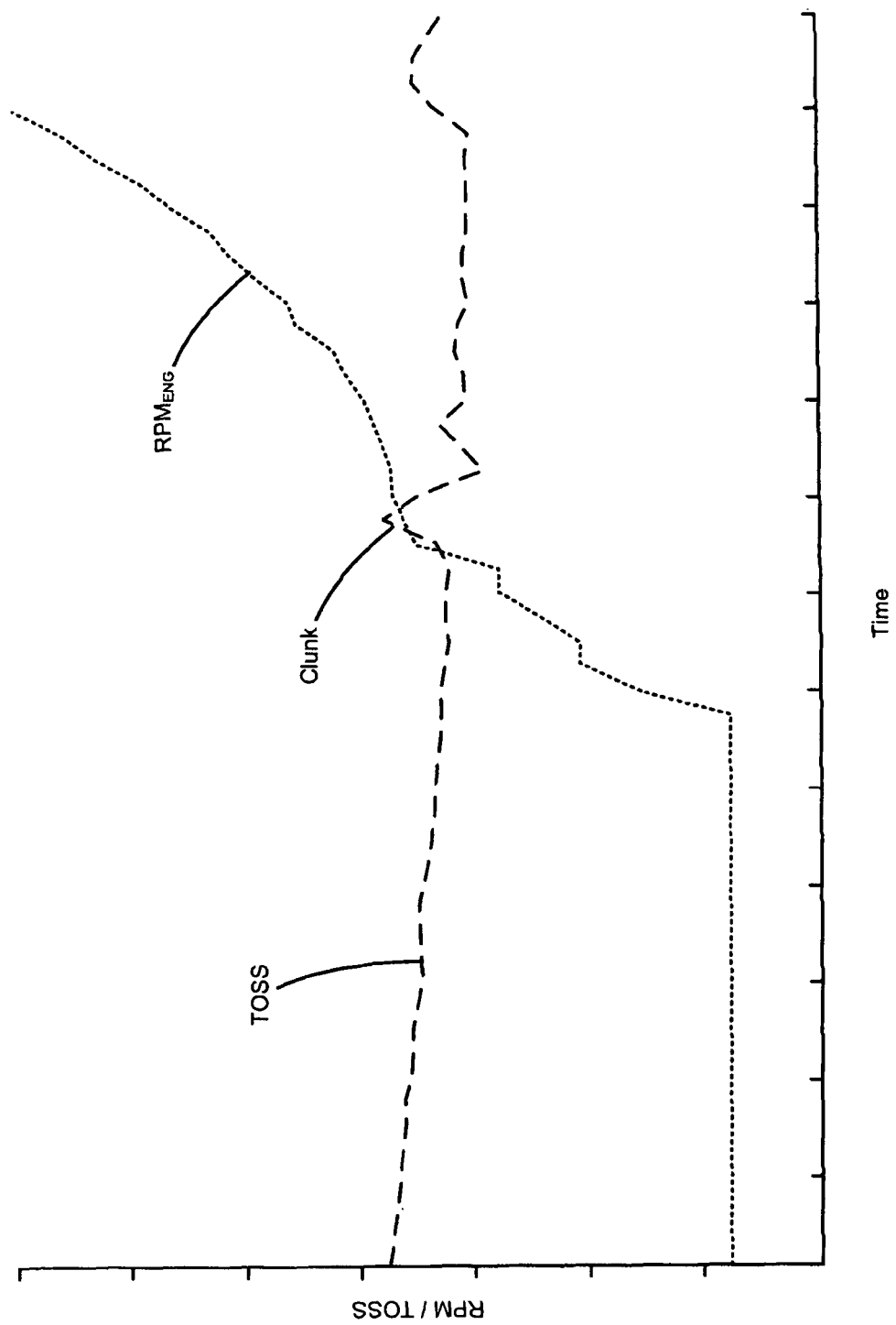
FIG. 2 is a graph of exemplary vehicle parameters illustrating an auto-start of a traditional hybrid vehicle including driveline clunk.
Figure 3:
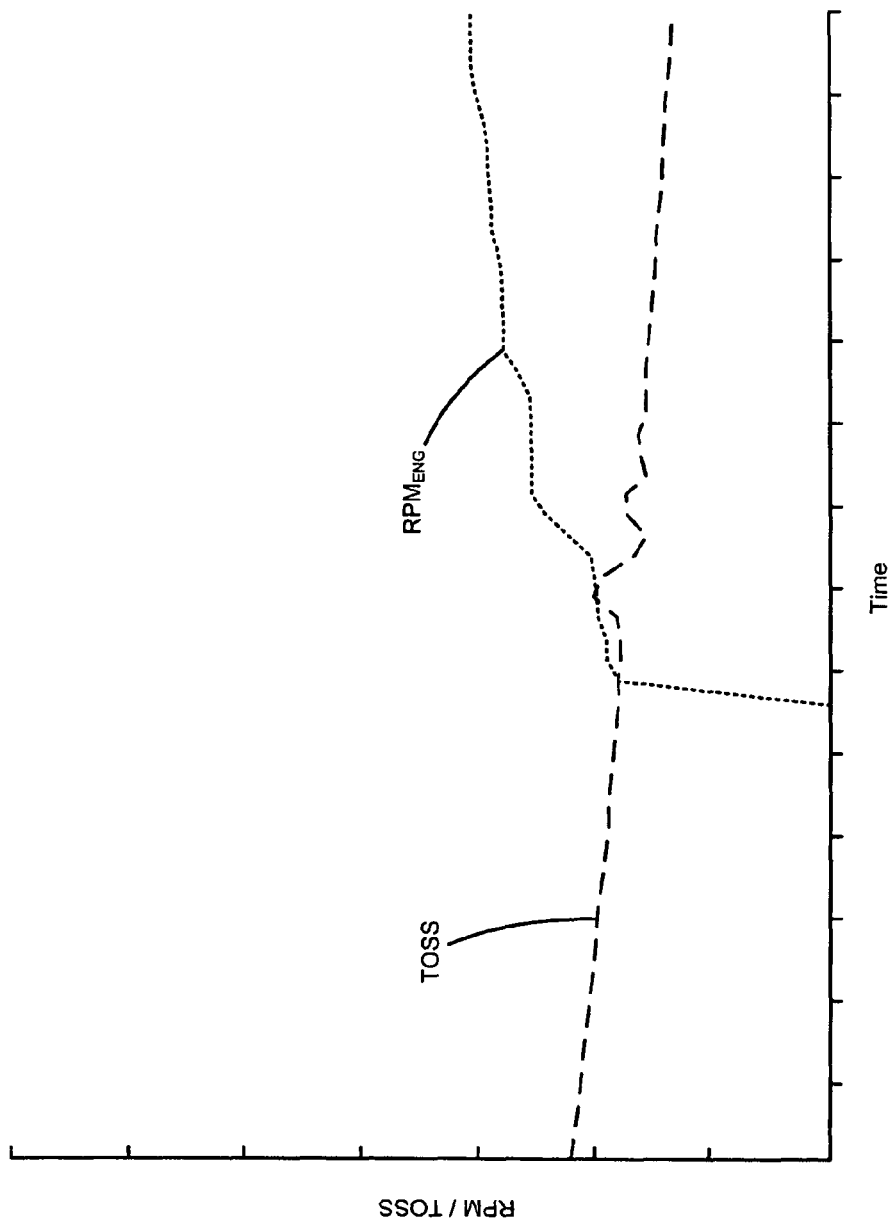
FIG. 3 is a graph of exemplary vehicle parameters illustrating an auto-start of a hybrid vehicle implementing the driveline clunk control of the present invention.

Clunk intensity has been quantified either subjectively or by using vehicle accelerometers or microphones to allow an objective measurement. For example, when an accelerometer is mounted on a vehicle component (e.g., a differential), the onset of clunk is observable. The impact of the rotating driveline components stopped by the grounded tire force to the drive surface gives a distinct signal with the timing and severity of the clunk. This impact is also apparent by oscillation in the TOSS signal. FIG. 2 shows exemplary TOSS and engine RPM signals for a vehicle with severe clunk. FIG. 3 shows exemplary TOSS and engine RPM signals for a vehicle without clunk.

The driveline clunk control of the present invention determines a TOSS-based parameter designated as $\Delta TOSS$. $\Delta TOSS$ is defined either as one of the following:

$ABS|TOSS-TOSS_{FILT}|$;

$\Delta TOSS_{MINt1 \rightarrow t2}$; or $m_{Toss}$.

where $TOSS_{FILT}$ is determined by filtering the TOSS signal (e.g., using a low-pass filter), $\Delta TOSS_{MINt1 \rightarrow t2}$ is a minimum change in TOSS over a fixed sampling period and $m_{TOSS}$ is the slope or rate of change of the TOSS signal when plotted against time.

Clunk events including, but not limited to hybrid auto-starts, transition from deceleration fuel cut-off, torque converter locking and transmission coast downshifts, can be identified using $\Delta TOSS$. More specifically, a logging file of operating variables including, but not limited to, TOSS is used to map clunk events. By examining the operating parameters, optimal control variables can be selected for predicting when clunk will occur. This clunk mapping procedure can be used on traditional and non-traditional (e.g., hybrid) vehicles to detect and to deter clunk. The mapping procedure is achieved by executing clunk-generating maneuvers (e.g., hybrid auto-starts) at varying vehicle speeds, road conditions and accelerator pedal positions and recording various vehicle parameters. By plotting the engine and/or electric machine speed at which the clunk occurred as a function of TOSS, a linear transfer function is developed. In this manner, corrective action can be identified to reduce and/or eliminate the clunk.

For example, in the case of a hybrid vehicle the linear transfer function describes at what engine speed the second ramp (i.e., the lash removal ramp) should occur. As a further example, if the hybrid vehicle includes a torque converter, $\Delta TOSS$ indicates when the torque output goes from negative to positive driveline torque. There is a correlation between the lash removal engine speeds, which is also the torque converter input speed, and TOSS. By examining the engine and/or electric machine RPM at which $\Delta TOSS$ occurs, lash removal can be identified. By using this technique to time when the angular acceleration of the torque converter input should be reduced, clunk resulting from auto-start can be eliminated.

Because high frequency TOSS oscillation indicates when the lash is removed from the driveline, the driveline clunk control of the present invention adaptively adjusts the lash removal phase of clunk events including, but not limited to hybrid auto-starts, transition from deceleration fuel cut-off, torque converter locking and transmission coast downshifts. For example, an RPM error ($RPM_{ERR}$) is determined by comparing the engine RPM at which the actual lash removal occurred, as indicated by $\Delta TOSS$, and the engine RPM at which the lash removal procedure occurs. The engine RPM at which the lash removal procedure occurs is determined from a multi-dimension look-up table as a function of TOSS. The look-up table is adaptively corrected based on $RPM_{ERR}$ such that the lash removal procedure occurs at the desired engine RPM.

This adaptive technique can be applied whenever the driveline goes from a motoring state to a drive state. For example, when a vehicle transitions from fuel cut-off to refueling, spark retard is used during the lash removal procedure to reduce the clunk that occurs during that transition. The actual timing of the spark retard can be adaptively adjusted using $\Delta TOSS$ as an indicator of the actual lash removal. The duration of this spark retard can also be determined by using $\Delta TOSS$ signal as an end point. As a further example, the engine and/or electric machine RPM at which the second ramp (i.e., lash removal) of the triple ramp auto-start procedure occurs, is determined from the look-up table based on $\Delta TOSS$.

Figure 4:
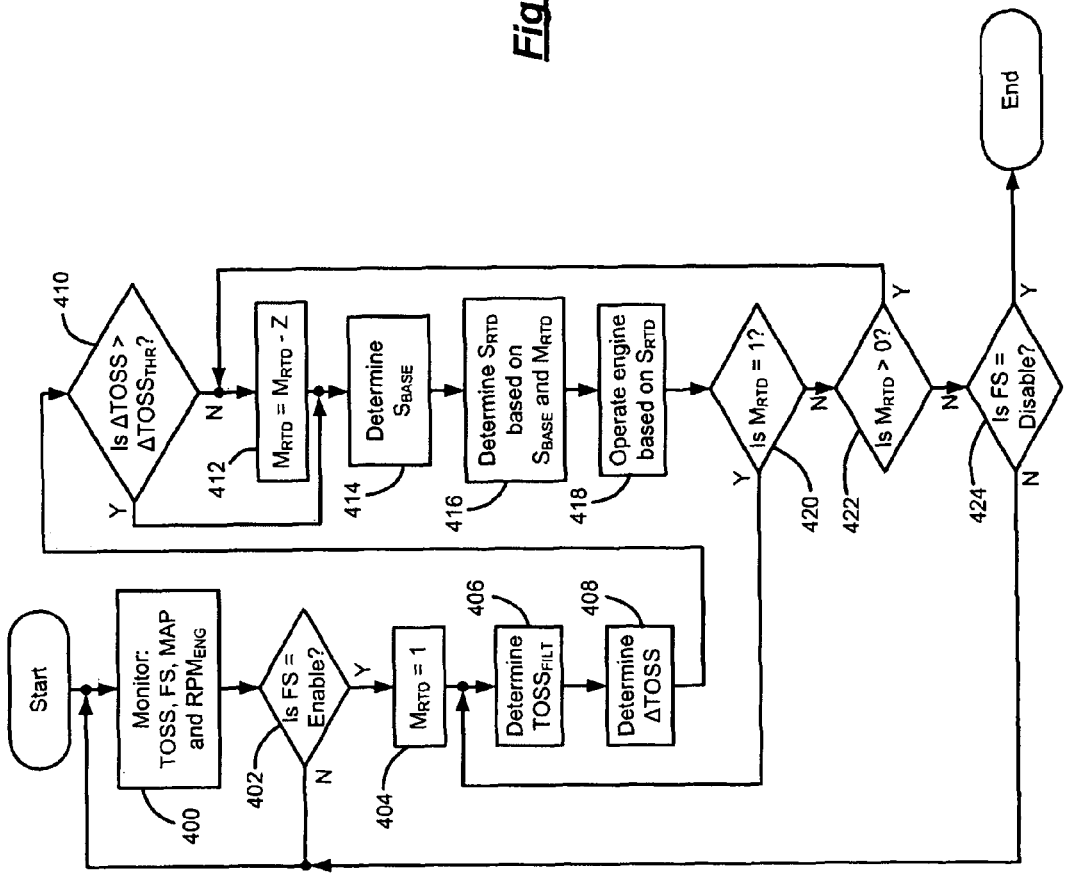
FIG. 4 is a flowchart illustrating exemplary steps executed by the driveline clunk control in an open-loop control mode.

Referring now to FIG. 4, exemplary steps executed by the driveline clunk control of the present invention will be discussed in detail. In step 400, control monitors TOSS, a fuel state (FS) (i.e., fuel enable (ON) or fuel disable (OFF)) MAP and engine RPM ($RPM_{ENG}$). In step 402, control determines whether FS is equal to enable (i.e., is re-fueling of the engine or auto-start desired). If FS is not equal to enable, control loops back. If FS is equal to enable, control sets a spark retard multiplier ($M_{RTD}$) equal to 1 in step 404. In step 406, control filters TOSS using a filter (e.g., low-pass filter) to provide $TOSS_{FILT}$. Control determines $\Delta TOSS$ in step 408. For example, $\Delta TOSS$ can be determined as the absolute value of the difference between TOSS and $TOSS_{FILT}$.

In step 410, control determines whether $\Delta TOSS$ is greater than a $\Delta TOSS$ threshold ($\Delta TOSS_{THR}$). If $\Delta TOSS$ is greater than $\Delta TOSS_{THR}$, control continues in step 412. If $\Delta TOSS$ is not greater than $\Delta TOSS_{THR}$, control continues in step 414. In step 412, control decrements $M_{RTD}$ by a value Z, which is greater than zero and less than one. In step 414, control determines a base spark retard ($S_{BASE}$) from a multi-dimensional look-up table based on $RPM_{ENG}$ and MAP. Control determines the actual spark retard ($S_{RTD}$) based on $S_{BASE}$ and $M_{RTD}$ in step 416. $S_{RTD}$ is preferably determined as the product of $S_{BASE}$ and $M_{RTD}$. The engine is operated based on $S_{RTD}$ in step 418.

In step 420, control determines whether $M_{RTD}$ is equal to one. If $M_{RTD}$ is equal to one, control loops back to step 406. If $M_{RTD}$ is not equal to one, control determines whether $M_{RTD}$ is greater than zero in step 422. If $M_{RTD}$ is greater than zero, control loops back to step 412. If $M_{RTD}$ is not greater than zero, control determines whether FS is equal to disable in step 424. If FS is not equal to disable, control loops back to step 400. If FS is equal to disable, control ends. Although the above exemplary steps described control of spark retard for engine refueling after fuel cut-off, it is appreciated that the exemplary steps can be modified to describe engine ramp control in the case of a hybrid electric vehicle auto-start.

Figure 5:
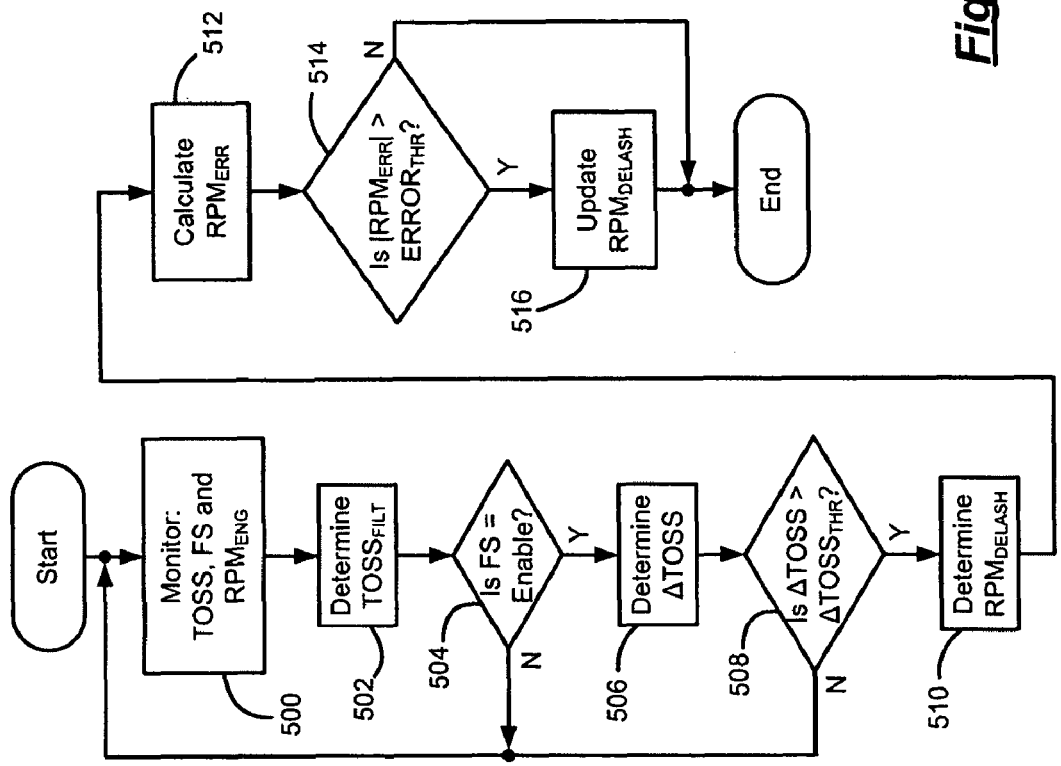
FIG. 5 is a flowchart illustrating exemplary steps executed by the driveline clunk control in an adaptive control mode.

Referring now to FIG. 5, exemplary steps executed by the driveline clunk control for adaptively updating the control, are discussed in detail. It is appreciated that the adaptive updating can occur parallel to the spark retard control described above. In step 500, control monitors TOSS, FS and $RPM_{ENG}$. In step 502, control determines $TOSS_{FILT}$. Control determines whether FS is equal to enable in step 504. If FS is not equal to enable, control loops back to step 500. If FS is equal to enable, control determines $\Delta TOSS$ in step 506.

In step 508, control determines whether $\Delta TOSS$ is greater than $\Delta TOSS_{THR}$. If $\Delta TOSS$ is not greater than $\Delta TOSS_{THR}$, control loops back to step 500. If $\Delta TOSS$ is greater than $\Delta TOSS_{THR}$, control determines the engine RPM at which the lash removal should occur ($RPM_{DE-LASH}$) from a look-up table based on TOSS. In step 510, control determines $RPM_{ERR}$ as the difference between $RPM_{ENG}$ and $RPM_{DE-LASH}$. Control determines whether the absolute value of $RPM_{ERR}$ is greater than an error threshold ($ERROR_{THR}$) in step 512. If the absolute value of $RPM_{ERR}$ is not greater than $ERROR_{THR}$, control ends. If the absolute value of $RPM_{ERR}$ is greater than $ERROR_{THR}$, control updates $RPM_{DE-LASH}$ in step 514 and control ends. $RPM_{DE-LASH}$ is updated by summing $RPM_{DE-LASH}$ and $RPM_{ERR}$ to provide an updated $RPM_{DE-LASH}$.

Figure 6:
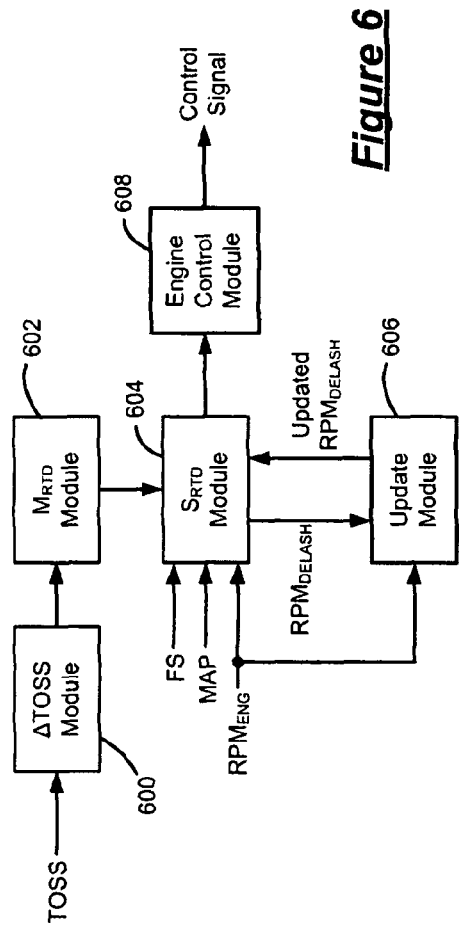
FIG. 6 is a functional block diagram of exemplary modules that execute the driveline clunk control of the present invention.

Referring now to FIG. 6, exemplary modules that execute the driveline clunk control of the present invention will be described in detail. The modules include a $\Delta TOSS$ module 600, an $M_{RTD}$ module 602, an $S_{RTD}$ module 604, an update module 606 and an engine control module 608. The $\Delta TOSS$ module 600 determines $\Delta TOSS$ based on the TOSS signal. The $M_{RTD}$ module 602 determines $M_{RTD}$ based on $\Delta TOSS$. The $S_{RTD}$ module 604 determines $S_{BASE}$ based on $RPM_{END}$, MAP and FS, and determines $S_{RTD}$ based on $S_{BASE}$ and $M_{RTD}$. The update module 606 updates $RPM_{DE-LASH}$ based on an original $RPM_{DE-LASH}$ provided by the $S_{RTD}$ module 604 and $RPM_{ENG}$. The engine control module 608 generates control signals to operate the engine 12 based on $S_{RTD}$.

Figure 7:
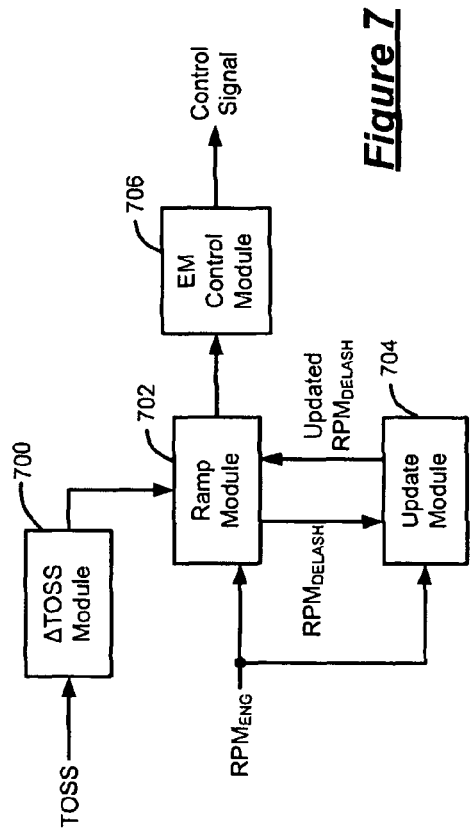
FIG. 7 is a functional block diagram of alternative exemplary modules that execute the driveline clunk control of the present invention.

Referring now to FIG. 7, alternative exemplary modules that execute the driveline clunk control of the present invention will be described in detail. The exemplary modules include a $\Delta TOSS$ module 700, a ramp module 702, an update module 704 and an electric machine (EM) control module 706. The $\Delta TOSS$ module 700 determines $\Delta TOSS$ based on TOSS. The ramp module 602 determines $RPM_{DE-LASH}$, at which the second ramp of the electric machine 22 occurs. The update module 704 updates $RPM_{DE-LASH}$ based on an original $RPM_{DE-LASH}$ provided by the ramp module 702 and $RPM_{ENG}$. The EM control module 706 generates control signals to operate the electric machine based on the second ramp.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A driveline clunk control system for a vehicle having an engine that drives a driveline through a transmission, comprising:

a transmission output shaft speed (TOSS) sensor that measures a TOSS and that generates a TOSS signal based on said TOSS;

a first module that receives said TOSS signal and that determines a secondary parameter (ΔTOSS) based on said TOSS signal;

a second module that detects onset of a clunk condition based on said ΔTOSS; and a third module that regulates operation of said vehicle to inhibit said clunk condition when said onset of said clunk condition is detected.

2. The driveline clunk control system of claim 1 wherein said third module regulates a spark timing of said engine to inhibit said clunk condition.

3. The driveline clunk control system of claim 2 wherein said second module determines a spark retard based on a base spark retard, a spark retard multiplier, an engine RPM and an engine manifold absolute pressure (MAP).

4. The driveline clunk control system of claim 3 wherein said second module decrements said spark retard multiplier when said ΔTOSS is greater than a ΔTOSS threshold.

5. The driveline clunk control system of claim 1 further comprising an electric motor that selectively generates drive torque to drive said driveline, wherein said third module regulates an RPM ramp of said electric motor to inhibit said clunk condition.

6. The driveline clunk control system of claim 1 further comprising a fourth module that updates an engine RPM de-lash value when said ΔTOSS is greater than a ΔTOSS threshold.

7. The driveline clunk control system of claim 6 wherein said fourth module determines an RPM error as a difference between an engine RPM and said engine RPM de-lash value and updates said engine RPM de-lash value when said RPM error exceeds an error threshold.

8. The driveline clunk control system of claim 7 wherein said engine RPM de-lash value is updated by summing said engine RPM and said RPM error to generate an updated engine RPM de-lash value.

9. The driveline clunk control system of claim 1 wherein said ΔTOSS is determined as an absolute value of a difference between said TOSS signal and a filtered TOSS signal.

10. The driveline clunk control system of claim 1 wherein said ΔTOSS is determined as a minimum change in said TOSS signal over a fixed sampling period.

11. The driveline clunk control system of claim 1 wherein said ΔTOSS is determined as a rate of change of said TOSS signal.

12. A method of detecting and controlling driveline clunk in a vehicle having an engine that drives a driveline through a transmission, comprising:

measuring a transmission output shaft speed (TOSS);

generating a TOSS signal based on said TOSS;

determining a secondary parameter (ΔTOSS) based on said TOSS signal;

detecting onset of a clunk condition based on said ΔTOSS, and regulating operation of said vehicle to inhibit said clunk condition when said onset of said clunk condition is detected.

13. The method of claim 12 wherein said step of regulating includes regulating a spark timing of said engine to inhibit said clunk condition.

14. The method of claim 13 further comprising determining a spark retard based on a base spark retard, a spark retard multiplier, an engine RPM and an engine manifold absolute pressure (MAP).

15. The method of claim 14 further comprising decrementing said spark retard multiplier when said ΔTOSS is greater than a ΔTOSS threshold.

16. The method of claim 12 further comprising an electric motor that selectively generates drive torque to drive said driveline, wherein said step of regulating includes regulates an RPM ramp of said electric motor to inhibit said clunk condition.

17. The method of claim 12 further comprising updating an engine RPM de-lash value when said ΔTOSS is greater than a ΔTOSS threshold.

18. The method of claim 17 further comprising:

determining an RPM error as a difference between an engine RPM and said engine RPM de-lash value; and updating said engine RPM de-lash value when said RPM error exceeds an error threshold.

19. The method of claim 18 wherein said engine RPM de-lash value is updated by summing said engine RPM error and said engine RPM to generate an updated engine RPM de-lash value.

20. The method of claim 12 wherein said ΔTOSS is determined as an absolute value of a difference between said TOSS signal and a filtered TOSS signal.

21. The method of claim 12 wherein said ΔTOSS is determined as a minimum change in said TOSS signal over a fixed sampling period.

22. The method of claim 12 wherein said ΔTOSS is determined as a rate of change of said TOSS signal.

23. A method of detecting and controlling driveline clunk in a vehicle having an engine that drives a driveline through a transmission, comprising:

measuring a transmission output shaft speed (TOSS);

generating a TOSS signal based on said TOSS;

determining a secondary parameter (ΔTOSS) based on said TOSS signal;

detecting onset of a clunk condition based on said ΔTOSS;

regulating operation of said vehicle to inhibit said clunk condition when said onset of said clunk condition is detected; and updating an engine RPM de-lash value based on an RPM error when said ΔTOSS is greater than a ΔTOSS threshold, wherein said updating is achieved by summing said engine RPM and said RPM error to generate an updated engine RPM de-lash value.

24. The method of claim 23 wherein said step of regulating includes regulating a spark timing of said engine to inhibit said clunk condition.

25. The method of claim 24 further comprising determining a spark retard based on a base spark retard, a spark retard multiplier, an engine RPM and an engine manifold absolute pressure (MAP).

26. The method of claim 25 further comprising decrementing said spark retard multiplier when said ΔTOSS is greater than a ΔTOSS threshold.

27. The method of claim 23 further comprising an electric motor that selectively generates drive torque to drive said driveline, wherein said step of regulating includes regulates an RPM ramp of said electric motor to inhibit said clunk condition.

28. The method of claim 23 further comprising:

determining an RPM error as a difference between an engine RPM and said engine RPM de-lash value; and updating said engine RPM de-lash value when said RPM error exceeds an error threshold.

29. The method of claim 23 wherein said ΔTOSS is determined as an absolute value of a difference between said TOSS signal and a filtered TOSS signal.

30. The method of claim 23 wherein said ΔTOSS is determined as a minimum change in said TOSS signal over a fixed sampling period.

31. The method of claim 23 wherein said ΔTOSS is determined as a rate of change of said TOSS signal.

* * * * *